June 20, 1933.  A. J. MANSURE  1,914,576
AUTOMATIC TEMPERATURE OR PRESSURE CONTROLLER
Filed Nov. 4, 1929  2 Sheets-Sheet 1

INVENTOR
ARTHUR J. MANSURE
BY Whittemore Hulbert
Whittemore & Belknap
ATTORNEYS

Patented June 20, 1933

1,914,576

UNITED STATES PATENT OFFICE

ARTHUR J. MANSURE, OF DETROIT, MICHIGAN, ASSIGNOR TO THE BRISTOL COMPANY, OF WATERBURY, CONNECTICUT, A CORPORATION OF CONNECTICUT

AUTOMATIC TEMPERATURE OR PRESSURE CONTROLLER

Application filed November 4, 1929. Serial No. 404,720.

This invention relates to control devices and has particular reference to a device for controlling the flow of a fluid or the like through a conduit.

One of the objects of this invention is to provide primary and secondary controls for regulating the flow of a fluid through a supply conduit together with means for bringing the secondary control into operation only upon unusual changes in the demand for the fluid at the point of use.

A further object of this invention is to provide means for maintaining a fluid control valve within its best working range whereby an extremely sensitive control of a supply of fluid to the point of use may be maintained.

Other objects and advantages of the invention together with the numerous novel details of construction will become more apparent as the following description proceeds, particularly when reference is had to the accompanying drawings wherein, Figure 1 is a semi-diagrammatic view of a control system constructed in accordance with the teachings of this invention;

Figure 1:
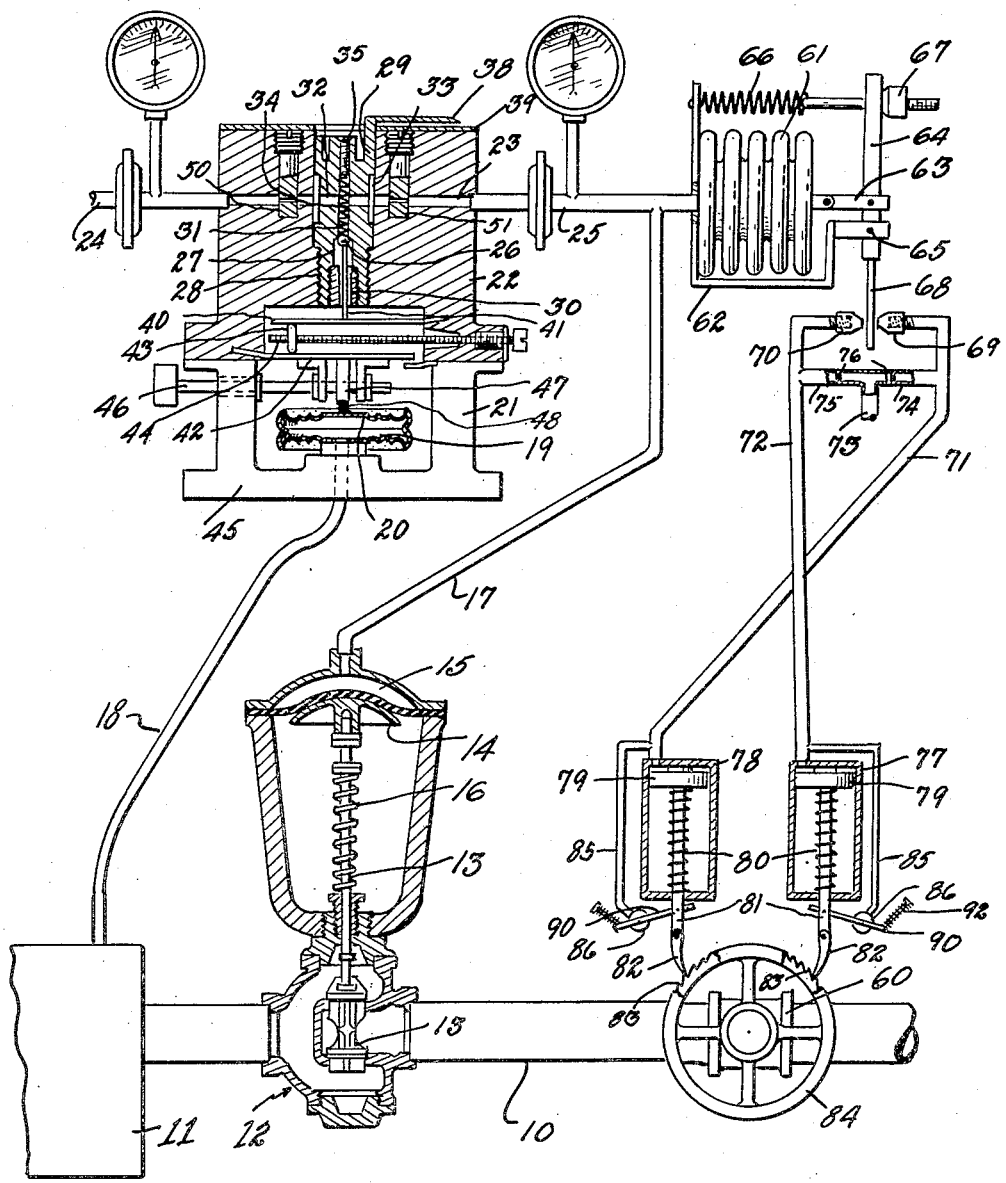

Referring then particularly to the drawings wherein one embodiment of the inventive idea is disclosed and wherein like reference characters designate corresponding parts throughout all views, the numeral 10 designates a fluid supply pipe for supplying a heating, cooling or pressure controlling fluid to a point of use, such for example as the chamber 11. A valve 12 is mounted in the pipe 10 and this valve is provided with a stem 13 connected to a diaphragm 14 which closes one side of a chamber 15. A spring 16 urges the valve to open position while a conduit 17 supplies air under pressure to the chamber 15 for actuating the diaphragm to urge the valve to closed position.

A thermostat (not shown) is mounted in the chamber 11 and is connected by a tube 18 with a diaphragm chamber 19 having a flexible top 20. This diaphragm chamber is mounted in a bracket 21 and associated with this bracket is a body or casting 22 provided with the transversely extending bore 23. An air supply pipe 24 connected to a suitable source of air under pressure (not shown) communicates with one end of the bore 23 while a conduit 25 forms a connection between the other end of the bore 23 and the conduit 17. Thus air under pressure is supplied from the conduit 24 to the chamber 15 for actuating the valve 12 against the tension of the spring 16.

For controlling the pressure of the air within the chamber 15, there is provided a valve 26 mounted in a chamber 27 in a valve body 28 which is threaded in a bore 29 formed in the member 22 transversely of the bore 23. The chamber 27 communicates by means of a passage 30 with the atmosphere and by means of a passage 31 with a bore 32 which in turn is in constant communication with the bore 23 by means of an annular recess 33 formed in the valve body 28. As illustrated in the drawings, the valve 26 is adapted to close communication between the bore 32 and the atmosphere by seating either on the end of the passage 31, or on the end of the passage 30, the valve being in one case a direct acting controller and being in the other case a reverse acting controller.

Figure 2:
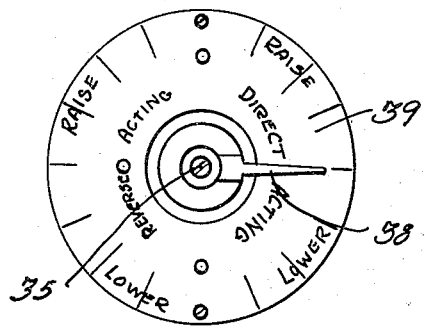
Figure 2 is a top plan view of a portion of the structure shown in Figure 1.
Figure 3:
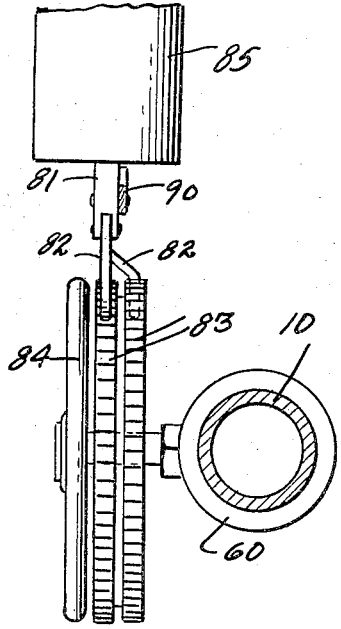
Figure 3 is a fragmentary elevational view of a portion of the structure shown in Figure 1.
Figure 4:
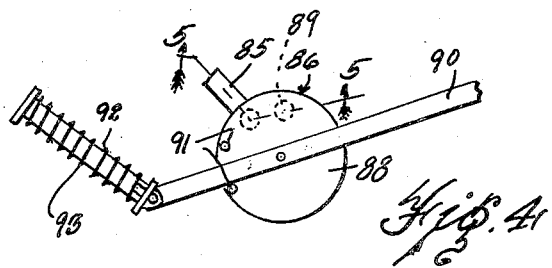
Figure 4 is an enlarged elevational view of a portion of the structure shown in Figure 1.
Figure 5:
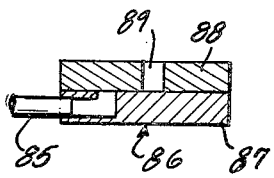
Figure 5 is a detail sectional view taken substantially on the line 5—5 of Figure 4.

A spring 34 adjustable by a screw 35 engages the valve 26 for modifying the action thereof, while the valve body 28 may be threadedly adjusted longitudinally of the bore 29 to vary the position of the ports therein relative to the valve 26. For indicating the position of the valve body and therefore of the ports, relative to the valve 26, an indicating finger 38 is carried by the valve body for movement relative to an indicating plate 39 fixed to the top of the member 22. One half of the plate 39 is calibrated to indicate the adjustment of the valve body 28 when the valve 26 acts as a direct controller while the other half of the plate 39 is calibrated to indicate the position of the valve body when the valve 26 acts as a reverse acting controller. Thus as indicated in Figure 2 of the drawings, the finger 38 provides means for adjusting the valve body and for indicating the position thereof.

For actuating the valve 26 upon movement of the top 20 of the diaphragm chamber, there is provided a plate like spring member 40 having its one end fixed to the member 22 and engaging intermediate its ends the stem 41 of the valve. A second plate like member 42 is arranged in spaced relation to the member 40 and is mounted at its end in the opposite side of the member 22. A roller or like member 43 is arranged between the plates 40 and 42 for moving the one from the other and this member is threadedly mounted on a shaft 44 whereby the same may be adjusted longitudinally of the plate like members and relative to the pivot points thereof by rotation of the shaft 44. The member 42 is engaged by the brackets 45 which support a shaft 46 which in turn carries a cam 47. Between this cam and the top of the diaphragm chamber is a spring 48 whereby upward movement of the top 20 effects a movement upwardly of the cam 47 and of the plates 42 and 40. Obviously the amount which the valve 26 will be moved by any given movement of the top 20 may be varied by adjustment of the cam 47, the roller 43, and the valve body 28, so that the valve 26 may be adjusted to open at any desired pressure or temperature within the chamber 11.

As thus far described, the operation of the device is as follows: A set air pressure within predetermined limits is maintained within the chamber 15 by proper adjustment of the cam 47 and roller 43 to hold the valve 12 at its best working position and to permit the flow of sufficient heating, cooling or pressure fluid to the chamber 11 to maintain the same at the proper temperature. Obviously if the temperature within the chamber 11 increases the valve 26 will be closed, thus permitting pressure to build up in the chamber 15 to partially close the valve 12, thus reducing the supply of fluid to the chamber 11. If, on the other hand, the temperature within the chamber 11 decreases beyond the desired temperature, the valve 26 will be opened wider to permit more air to exhaust from the bore 23 and chamber 15, whereby the spring 16 will move the valve 12 toward open position. Orifice plates 50 and 51 are mounted in the bore 23, the restricted orifice in the plate 50 rendering the valve 26 more sensitive to operation by the diaphragm chamber 19 and the restricted orifice in plate member 51 acting to slow up the actuation of the valve 12.

The structure as thus far described functions efficiently to control the temperature or pressure within the chamber 11 between certain predetermined limits. During the normal operation of the device the valve 12 will move but slightly, the arrangement being such that a substantially constant pressure is maintained in the chamber 15 to hold the valve in such a position that the required amount of fluid will be supplied to the chamber 11. Thus, the valve may be set at its best working position and will fluctuate but slightly from this position.

If, however, the demand for the fluid supplied by pipe 10 is increased or decreased beyond certain limits, difficulties are encountered in that the valve 12 will either be incapable of permitting sufficient fluid to pass to the conduit 10 or be moved so far from its best working position as to function inefficiently to control the supply of fluid through the conduit 10. Accordingly the present invention contemplates in particular the provision of auxiliary means for modifying the flow of fluid through the conduit 10 upon a predetermined change in the demand for the fluid, so that the valve 12 may be maintained at its best working position.

While numerous arrangements might be provided for accomplishing this result, one arrangement is shown in detail in the drawings and includes an auxiliary valve 60 arranged in the conduit 10 in advance of the valve 12. The setting of the valve 60 determines the pressure at which the fluid is delivered to the valve 12 up to the full limit of the conduit 10 and thus determines the amount of fluid which flows past the valve 12 upon any predetermined actuation of the same. Therefore, if a fluid is initially supplied to the pipe 10 at a pressure of, for example, 30 pounds, the valve 60 may be set to reduce the pressure of the fluid in advance of the valve 12 to, for example, fifteen pounds. Obviously, if the valve 60 is subsequently opened wider, the pressure in advance of the valve 12 will be increased while if the valve 60 is subsequently partially closed, the predetermined amount of pressure in advance of the valve 12 will be proportionately decreased.

The valve 60 is actuated automatically upon a predetermined change in the demand for the fluid supplied by pipe 10 to thus vary the flow of fluid past the valve 12 while maintaining the valve 12 at substantially its original position. To accomplish this there is provided a diaphragm chamber 61 connected to the conduit 25 for receiving air under pressure therefrom. This chamber is supported by a bracket 62 and is provided with a stem 63 which engages a lever 64 pivoted as at 65 on the bracket. A spring 66 may be adjusted by the nut 67 to balance the pressure within the diaphragm chamber 61 to the normal pressure within the chamber 15.

The lever 64 is provided with an extended end 68 arranged between ports 69 and 70 formed on the ends of conduits 71 and 72 respectively. The ports 69 and 70 are formed in nozzles threadedly mounted on the conduits and are thus adjustable relative to the end of the lever 64 so that one or the other of these ports will be closed by the portion 68 of the lever upon a predetermined movement of the lever about its pivot. Air is supplied to the conduits 71 and 72 by a suitable air supply pipe 73 provided with the branches 74 and 75 communicating with the conduits 71 and 72 respectively. Orifice plates 76 are arranged in the branches 74 and 75 to adjust the pressure of the air supplied to the conduits 71 and 72 from the supply pipe 73.

The conduits 71 and 72 are extended downwardly and communicate with the upper ends of cylinders 77 and 78 respectively. Each cylinder is provided with a piston 79 normally held in its uppermost position by a spring 80 which surrounds the stem 81 of the piston and each stem is extended through the lower end of its respective cylinder and carries a pawl 82 for engaging a ratchet 83 on the control member 84 of the valve 60. Each conduit 71 and 72 is provided with a bypass 85 which terminates in an air escape valve body 86, it being noted that each valve body includes a fixed plate 87 and a second plate 88 rotatably mounted thereon. Each plate 88 is provided with an exhaust port 89 adapted upon a predetermined rotation of the plate 88 to register with the end of the bypass 85 to permit an exhaust of air through this bypass. A lever 90 fixed to the plate 88 is engaged by the stem of the piston and moves between predetermined limits established by the pins 91 carried by the plate 87. A spring 92 mounted on a pin 93 engages the end of the lever 90 to move the same with a snap action between the limits of its movement as the point of pivotal connection between the lever 90 and pin 93 moves to one side or the other of the axis of the plate 88. The arrangement is such that when the piston 79 is moved to its lowermost position, the exhaust port 89 is moved into registration with the bypass 85 to permit an exhaust of air through this bypass whereby the pressure is reduced above the piston to such an extent that the spring 80 may return the piston to its original position.

Air is constantly supplied to the conduits 71 and 72 through the supply pipe 73 and when the lever 64 is in the position shown in the drawings, this air is exhausted through the ports 69 and 70. However, upon a predetermined movement of the diaphragm chamber 61, the lever 64 is moved about its pivot to close one or the other of the ports 69 or 70. If the port 69 is closed, pressure is built up in the conduit 71 which effects a reciprocation of the piston in the cylinder 78, the pawl carried by the piston rod associated with this piston then acting to move the valve 60 toward open position. If on the other hand the port 70 is closed, pressure is built up in the conduit 72 which effects a reciprocation of the piston in the cylinder 77 to thus move the valve 60 toward closed position. Movement of the valve 60 toward either open or closed positions varies the pressure of the fluid supplied to the valve 12 and thus varies the flow of the fluid past this valve and to the chamber 11.

From the above it is believed that the structure and operation of the invention will be clearly apparent. The cam 47 and roller 43 are initially set to maintain a predetermined desired pressure in the chamber 15 to thus hold the valve 12 in a position to maintain the desired temperature in the chamber 11. Upon slight variations in the temperature within the chamber 11, the valve 26 will be actuated to increase or decrease the pressure within the chamber 15 and thus move the valve 12 between predetermined limits.

If, however, there is a decided change in the demand for the fluid supplied by the pipe 10 as, for example, would occur where the pipe 10 was supplying a heating fluid to a volume of water in the chamber 11 and this volume of water were substantially greatly increased, then the valve 60 is actuated to modify the flow of fluid through the conduit 10 to take care of this increased demand while permitting the valve 12 to remain substantially at its initial position. Thus, if the volume of liquid to be heated in the chamber 11 is increased the diaphragm chamber 19 will be contracted due to the drop in temperature in the chamber 11 and the valve 26 will be opened. This will effect a drop of pressure in the chambers 15 and 61, the latter chamber being initially set at the normal pressure with the chamber 15. A drop of pressure within the chamber 61 beyond a predetermined desired limit as set by the position of the port 69 relative to the portion 68 of the lever 64 will cause the lever 64 to be moved to such a position that the port 69 will be closed. Pressure will then be built up in the conduit 71 and the piston in the cylinder 78 will be actuated and the valve 60 will be opened. Thus fluid at an increased pressure will be supplied to the valve 12 so that without a greater opening of the valve 12 a larger quantity of heating fluid will be supplied to the chamber 11. Thus, after the valve 60 has been opened the pressure in the chambers 15 and 61 will return to the normal set pressure and the mechanism will continue to operate in its usual manner, there being however, a greater quantity of fluid applied to the chamber 11 without a variation in the opening of the valve 12 or pressure in the chamber 15. This operation will continue indefinitely unless the volume of water to be heated in the chamber 11 is again changed materially in which event the valve 60 will be actuated to again modify the flow of fluid through the conduit 10 to compensate for the changed conditions.

Thus it will be readily understood that the auxiliary control means modifies the flow of fluid through the conduit 10 to compensate for changes in the demand for the fluid beyond certain predetermined limits. The valve 60 is automatically actuated and modifies the flow of fluid through the conduit 10 to maintain the valve 12 at its best working position and to thus accurately maintain a desired temperature in the chamber 11 regardless of changes in volume of the liquid to be heated or any change that may effect the controlled temperature.

While the mechanism for actuating the valve 60 has been described as air operated, it will be readily understood that the mechanism may be operated by any fluid under pressure, electrically or otherwise. It will be further understood that the description is for the purposes of illustration only and is not definitive of the limits of the inventive idea, the right being reserved to make such changes in the details of construction and arrangement of parts as will fall within the purview of the attached claims.

What I claim as my invention is:

1. In combination, a fluid supply conduit, pressure actuated means for controlling the flow of fluid through said conduit in dependence upon variations in the demand for the same, and auxiliary pressure actuated means for modifying the flow of fluid through said conduit, said auxiliary means being arranged to operate only upon a predetermined change in the demand for the fluid.

2. In combination, a fluid supply conduit, a valve for controlling the flow of fluid through said conduit, means controlled by the demand for said fluid for actuating said valve, and auxiliary means operable upon a predetermined change in the demand for said fluid to modify the flow of said fluid through said conduit to said valve.

3. In combination a fluid supply conduit, a valve for controlling the flow of fluid through said conduit, means controlled by the demand for said fluid for actuating said valve, an auxiliary valve in said conduit for modifying the flow of fluid through the conduit to the first mentioned valve, and means for actuating said auxiliary valve upon a predetermined change in the demand for said fluid.

4. In combination a fluid supply conduit, a pressure actuated valve for controlling the flow of fluid through said conduit, means dependent upon the demand for said fluid for varying the pressure acting on said valve between predetermined limits to vary the flow of fluid through said conduit, and auxiliary means for modifying the flow of fluid through said conduit upon a predetermined variation in the pressure acting on said valve beyond said limits.

5. In combination, a fluid supply pipe, a main valve for controlling the flow of fluid through said pipe, an auxiliary valve in said pipe for controlling the pressure of said fluid on the supply side of said main valve, means for actuating said main valve upon variations in the demand for said fluid, and means for actuating said auxiliary valve upon a predetermined change in the demand for said fluid to modify the flow of fluid past said main valve upon the actuation thereof by said first mentioned means.

6. The combination with a heat exchange unit and a conduit for supplying a heat exchange fluid to said unit, of a valve for controlling the flow of said fluid to the unit, a diaphragm for controlling the actuation of said valve, means for supplying air under pressure to said diaphragm to actuate the same, an exhaust control valve for regulating the pressure of the air acting on said diaphragm, a thermostat exposed to the temperature of said heat exchange unit, and means for actuating said exhaust control valve upon actuation of said thermostat, said means including a pair of oppositely pivoted levers one of which engages said exhaust control valve, a member arranged between the levers for moving the one from the other, means for adjusting said member longitudinally of the levers to vary the actuation of one lever by the other, a cam movable upon actuation of said thermostat, means for moving the other of said levers upon movement of said cam, and means for adjusting said cam to vary the movement of said lever upon actuation of said thermostat.

7. In combination, a fluid supply pipe, a valve for controlling the flow of fluid through said pipe, a diaphragm for actuating said valve, a pressure chamber to which said diaphragm is exposed, a source of air under pressure, a conduit connecting said source of air to said pressure chamber, said conduit having an exhaust port intermediate its ends, a valve controlling said exhaust port, an orifice plate in said conduit between said source of air and said exhaust valve, and a second orifice plate in said conduit between said exhaust valve and said pressure chamber.

8. In combination, a fluid supply conduit, a diaphragm motor valve for controlling the flow of fluid therethrough, an auxiliary valve for regulating the pressure at which the fluid is delivered to said diaphragm motor valve to thereby control the flow of fluid past said valve at any predetermined position of the same, means for setting said auxiliary valve, means for adjusting the pressure on said diaphragm motor valve to set the same at its best working condition for permitting a predetermined flow of fluid through said conduit, means controlled by the demand for the fluid for varying the pressure acting on said valve to thus modify the flow of fluid through said conduit, and means for adjusting the setting of said auxiliary valve upon predetermined changes in the pressure acting on said diaphragm motor valve.

9. In combination, a fluid supply conduit, a diaphragm motor valve for controlling the flow of fluid therethrough, an auxiliary valve for regulating the pressure at which the fluid is delivered to said diaphragm motor valve to thereby control the flow of fluid past said valve at any predetermined position of the same, means for setting said auxiliary valve, means for adjusting the pressure on said diaphragm motor valve to set the same at its best working condition for permitting a predetermined flow of fluid through said conduit, means controlled by the demand for the fluid for varying the pressure acting on said valve to thus modify the flow of fluid through said conduit, and means for adjusting the setting of said auxiliary valve upon predetermined changes in the pressure acting on said diaphragm motor valve, said last mentioned means including a diaphragm chamber exposed to the pressure acting on said diaphragm motor valve, and means operable upon a predetermined expansion or contraction of said diaphragm chamber to actuate said auxiliary valve.

10. In combination, a fluid supply conduit, a diaphragm motor valve for controlling the flow of fluid therethrough, an auxiliary valve for regulating the pressure at which the fluid is delivered to said diaphragm motor valve to thereby control the flow of fluid past said valve at any predetermined position of the same, means for setting said auxiliary valve, means for adjusting the pressure on said diaphragm motor valve to set the same at its best working condition for permitting a predetermined flow of fluid through said conduit, means controlled by the demand for the fluid for varying the pressure acting on said valve to thus modify the flow of fluid through said conduit, and means for adjusting the setting of said auxiliary valve upon predetermined changes in the pressure acting on said diaphragm motor valve, said last mentioned means including a diaphragm chamber exposed to the pressure acting on said diaphragm motor valve, a ratchet for actuating said auxiliary valve, a pawl for actuating said ratchet, and means for actuating said pawl upon a predetermined movement of said diaphragm chamber.

11. In combination, a fluid supply conduit, a diaphragm motor valve for controlling the flow of fluid therethrough, an auxiliary valve for regulating the pressure at which the fluid is delivered to said diaphragm motor valve to thereby control the flow of fluid past said valve at any predetermined position of the same, means for setting said auxiliary valve, means for adjusting the pressure on said diaphragm motor valve to set the same at its best working condition for permitting a predetermined flow of fluid through said conduit, means controlled by the demand for the fluid for varying the pressure acting on said valve to thus modify the flow of fluid through said conduit, and means for adjusting the setting of said auxiliary valve upon predetermined changes in the pressure acting on said diaphragm motor valve, said last mentioned means including a pair of ratchets fixed to said auxiliary valve for actuating the same, pawls for actuating said ratchets, a diaphragm chamber exposed to the pressure acting on said diaphragm motor valve, means for adjusting said diaphragm chamber to the normal pressure maintained on said diaphragm motor valve, and means for actuating said pawls upon a predetermined variation of the pressure in said diaphragm chamber.

12. In combination, a fluid supply conduit, a diaphragm motor valve for controlling the flow of fluid therethrough, an auxiliary valve for regulating the pressure at which the fluid is delivered to said diaphragm motor valve to thereby control the flow of fluid past said valve at any predetermined position of the same, means for setting said auxiliary valve, means for adjusting the pressure on said diaphragm motor valve to set the same at its best working condition for permitting a predetermined flow of fluid through said conduit, means controlled by the demand for the fluid for varying the pressure acting on said valve to thus modify the flow of fluid through said conduit, and means for adjusting the setting of said auxiliary valve upon predetermined changes in the pressure acting on said diaphragm motor valve, said last mentioned means including ratchets for actuating said auxiliary valve, pawls for actuating said ratchets, pistons for actuating said pawls, a diaphragm chamber exposed to the pressure acting on said diaphragm motor valve, and means operable upon an expansion or contraction of said diaphragm chamber beyond predetermined limits for reciprocating one or the other of said pistons.

13. In combination, a fluid supply pipe, a pressure actuated valve for controlling the flow of fluid through said pipe, means for supplying a fluid under pressure to said valve to actuate the latter, means for varying the pressure of the fluid acting on said valve in dependence upon variations in the demand for the fluid controlled by said valve and means operable upon a predetermined variation in the pressure of the fluid acting on said valve to modify the effective actuation of said valve.

14. In combination, a fluid supply pipe, a main valve for controlling the flow of fluid through said pipe, a diaphragm for actuating said main valve, means for supplying a fluid under pressure to act on said diaphragm, an auxiliary valve for controlling the flow of fluid through said pipe, an expansible member for controlling the actuation of said auxiliary valve, and a connection between said expansible member and the source of fluid under pressure for said diaphragm whereby said auxiliary valve is actuated upon a predetermined actuation of said diaphragm.

15. In combination, a chamber, pressure actuated means for controlling the flow of a fluid to said chamber in dependence upon minor changes in the demand for the fluid, and additional pressure actuated means for varying the flow of fluid to the chamber, said additional means operating only upon major changes in the demand for the fluid in the chamber.

16. In combination, a chamber, a valve for controlling the flow of a fluid to said chamber, means responsive to minor changes in the demand for the fluid in said chamber for effecting slight adjustments of said valve, and means responsive to major changes in the demand for the fluid in said chamber for varying the flow of fluid past said valve incident to any minor adjustment thereof.

17. In combination, a chamber, a source of fluid supply to said chamber, a pair of valves through which the fluid must successively pass in its passage to the chamber, means responsive to minor changes in the demand for said fluid for adjusting one of said valves, and means responsive to major changes in the demand for said fluid for adjusting the other of said valves, said valves being arranged to be adjusted to intermediate positions between full open and full closed positions and the relative adjustments of said valves determining the amount of flow of the fluid to the chamber.

18. In combination, a chamber, a valve for controlling the flow of a fluid to said chamber, means responsive to minor changes in the demand for the fluid for actuating said valve, a second valve controlling the flow of the fluid to the first mentioned valve and thus controlling the pressure of the fluid supply to said first mentioned valve, and means operable upon major changes in the demand for the fluid for actuating said second mentioned valve.

19. In combination, a valve for controlling the flow of a fluid to a chamber, pressure actuated means for actuating said valve, means responsive to the demands for the fluid in the chamber for varying the pressure acting on said pressure actuated means, and means operable upon predetermined major changes in the pressure acting on said pressure actuated means to modify the flow of fluid past said valve incident to any predetermined actuation thereof.

20. In combination, a valve for controlling the flow of a fluid to a chamber, means including a relay controlled by the demand for the fluid for actuating said valve, and means operable upon a predetermined actuation of said relay incident to a major change in the demand for the fluid to vary the flow of fluid past said valve incident to any predetermined actuation of the valve.

21. In combination, a valve for controlling the flow of a fluid, means for actuating said valve, means responsive to the demands for the fluid for controlling the actuation of said valve actuating means, said last mentioned means being arranged to effect minor actuations of said valve actuating means upon minor changes in the demand for the fluid, and means operating upon major changes in the demand for the fluid to modify the flow of fluid past said main valve incident to any predetermined actuation of said valve actuating means.

In testimony whereof I affix my signature.

ARTHUR J. MANSURE.